(12) United States Patent
Rhodes

(10) Patent No.: US 7,506,046 B2
(45) Date of Patent: Mar. 17, 2009

(54) NETWORK USAGE ANALYSIS SYSTEM AND METHOD FOR UPDATING STATISTICAL MODELS

(75) Inventor: N. Lee Rhodes, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1059 days.

(21) Appl. No.: 09/919,527

(22) Filed: Jul. 31, 2001

(65) Prior Publication Data
US 2003/0028631 A1 Feb. 6, 2003

(51) Int. Cl.
*G06F 15/173* (2006.01)

(52) U.S. Cl. ............... 709/224; 709/223; 709/231; 705/10; 705/11; 705/52

(58) Field of Classification Search ......... 709/223–226, 709/231; 705/10–11, 52
See application file for complete search history.

(56) References Cited

U.S. PATENT DOCUMENTS

| | | |
|---|---|---|
| 4,361,877 A | 11/1982 | Dyer et al. |
| 4,827,508 A | 5/1989 | Shear |
| 5,155,680 A | 10/1992 | Wiedemer |
| 5,321,838 A | 6/1994 | Hensley et al. |
| 5,696,702 A | 12/1997 | Skinner et al. |
| 5,963,914 A | 10/1999 | Skinner et al. |
| 6,032,132 A | 2/2000 | Nelson |
| 6,138,121 A * | 10/2000 | Costa et al. .................. 707/100 |
| 6,321,338 B1 * | 11/2001 | Porras et al. ................. 713/201 |
| 6,393,386 B1 * | 5/2002 | Zager et al. .................... 703/25 |
| 6,460,045 B1 * | 10/2002 | Aboulnaga et al. ........... 707/102 |
| 6,539,375 B2 * | 3/2003 | Kawasaki ........................ 707/5 |
| 6,651,099 B1 * | 11/2003 | Dietz et al. .................. 709/224 |
| 6,771,646 B1 * | 8/2004 | Sarkissian et al. ............ 370/392 |
| 6,823,307 B1 * | 11/2004 | Steinbiss et al. ............. 704/252 |
| 6,839,751 B1 * | 1/2005 | Dietz et al. .................. 709/224 |
| 2001/0037321 A1 * | 11/2001 | Fishman et al. .............. 705/500 |
| 2002/0032717 A1 * | 3/2002 | Malan et al. ................. 709/105 |
| 2003/0023951 A1 * | 1/2003 | Rosenberg ................... 717/104 |
| 2008/0040224 A1 * | 2/2008 | Roker ........................... 705/14 |

OTHER PUBLICATIONS

Amer P D et al: "Management Of Sampled Real-TimeNetwork Measurements" Proceedings Of The Conference Call On Local Computer Networks, XX, XX, 1989, pp. 62-68, XP000618680 * p. 62, right-hand column, line 1—* p. 64, right-hand column, last paragraph—p. 65, left-hand column, paragraph 3 * "5 Windows n Network Behavior" * p. 66, right-hand column.

(Continued)

*Primary Examiner*—Glenton B Burgess
*Assistant Examiner*—Lashanya R Nash

(57) ABSTRACT

In one embodiment, the present invention provides a system and method for analyzing a stream of network data. The method includes generating a statistical model from a set of record events. A most recent record event is received. The statistical model is updated using the most recent record event by adding the most recent record event to the statistical model.

22 Claims, 13 Drawing Sheets

OTHER PUBLICATIONS

Hewlett-Packard: "hp dynamic netvalue analyzer 1.0—an hp netaction product" HP-Invent, 'Online! May 2001, XP002219757 Retrieved from the Internet: <URL:http://www.hp.com.au.malaysia/voip/08.pdf> 'retrieved on Oct. 31, 2002! * p. 2, left-hand column, paragraph 1 *.

Stefan Stapelberg, et al: "http-analyze (8L)" Internet Citation, Mar. 2, 1998, XP002213786 Description * p. 1 * Regular Invocation via cron * p. 17.

Greenhalgh, C. et al.: "Predicting network traffic for collaborative virtual environments" Computer Networks and ISDN Systems, North Holland Publishing. Amsterdam, NL, vol. 30, No. 16-18, Sep. 30, 1998, pp. 1677-1685, XP004138700 ISSN: 0169-7552 *p. 1678, left-hand column, paragraph 3—right-hand column, paragraph 1 * * p. 1679, right-hand column, paragraph 4.* *p. 1682, right-hand column, pargraph 4.3.*

Mogul J. C.: "Efficient Use of Workstations for Passive Monitoring of Local Area Networks" Computer Communications Review, Association for Computing Machinery. New York, US, vol. 20, No. 4, Sep. 1, 1990, pp. 253-263, XP000168059 ISSN: 0146-4833 *p. 257, right-hand column, line 1—p. 258, right-hand column, line 4 *.

Anonymous: "Communications Statistical Network Analysis Program" IBM Technical Disclosure Bulletin, IBM Corp. New York, US, vol. 23, No. 9, Feb. 1, 1981, pp. 4282-4288, XP002012076 ISSN: 0018-8689 * the whole document *.

Hewlett-Packard: "hp internet usage manager 3.1—an hp netaction product" Hp-Invent, 'Online! May 2001, pp. 1-4, XP002219758 Retrieved from the Internet: <URL:http://www.hp.com/communications/usage/infolibrary/prodinfo/ium_product_brief_3.1pdf> 'retrieved on Oct. 29, 2002! *the whole document*.

* cited by examiner

260

262  264

ID  USAGE

| | ID | USAGE | |
|---|---|---|---|
| 266 → | JOE | SUM | |
| 268 → | SUSAN | SUM | |
| 270 → | SAM | SUM | |
| 272 → | MARY | SUM | * ← 284 |
| 274 → | FRANK | SUM | |
| 276 → | ALICE | SUM | |
| 278 → | TOM | SUM | |
| 280 → | ⋮ | ⋮ | |
| 282 → | ⋮ | ⋮ | |

Fig. 11

NETWORK USAGE ANALYSIS SYSTEM AND METHOD FOR UPDATING STATISTICAL MODELS

CROSS REFERENCE TO RELATED APPLICATIONS

This patent application is related to the following Non-Provisional U.S. Patent Applications: Ser. No. 09/919,149, entitled "Network Usage Analysis System Having Dynamic Statistical Data Distribution System and Method," Ser. No. 09/548,124, entitled "Internet Usage Analysis System and Method"; and Ser. No. 09/919,148, entitled "Network Usage Analysis System and Method for Determining Excess Usage," which are all assigned to the same assignee as the present application, and are all herein incorporated by reference.

THE FIELD OF THE INVENTION

The present invention relates to a data analysis system and method, and more particularly, to a network usage analysis system and method providing updatable statistical representation of usage record events.

BACKGROUND OF THE INVENTION

Network systems are utilized as communication links for everyday personal and business purposes. With the growth of network systems, particularly the Internet, and the advancement of computer hardware and software technology, network use ranges from simple communication exchanges such as electronic mail to more complex and data intensive communication sessions such as web browsing, electronic commerce, and numerous other electronic network services such as Internet voice, and Internet video-on-demand.

Network usage information does not include the actual information exchanged in a communications session between parties, but rather includes metadata (data about data) information about the communication sessions and consists of numerous usage detail records (UDRs). The types of metadata included in each UDR will vary by the type of service and network involved, but will often contain detailed pertinent information about a particular event or communications session between parties such as the session start time and stop time, source or originator of the session, destination of the session, responsible party for accounting purposes, type of data transferred, amount of data transferred, quality of service delivered, etc. In telephony networks, the UDRs that make up the usage information are referred to as a call detail records or CDRs. In Internet networks, usage detail records do not yet have a standardized name, but in this application they will be referred to as internet detail records or IDRs. Although the term IDR is specifically used throughout this application in an Internet example context, the term IDR is defined to represent a UDR of any network.

Network usage information is useful for many important business functions such as subscriber billing, marketing & customer care, and operations management. Network usage data mediation systems are utilized for collecting, correlating, and aggregating network usage information as it occurs and creating UDRs as output that can be consumed by computer business systems that support the above business functions. Examples of these computer business systems include billing systems, marketing and customer relationship management systems, customer churn analysis systems, and data mining systems.

Especially for Internet networks, several important technological changes are key drivers in creating increasing demand for timely and cost-effective analysis of Internet usage information or the underlying IDRs.

One technological change is the dramatically increasing Internet access bandwidth at moderate subscriber cost. Most consumers today have only limited access bandwidth to the Internet via an analog telephony modem, which has a practical data transfer rate upper limit of about 56 thousand bits per second. When a network service provider's subscribers are limited to these slow rates there is an effective upper bound to potential congestion and overloading of the service provider's network. However, the increasing wide scale deployments of broadband Internet access through digital cable modems, digital subscriber line, microwave, and satellite services are increasing the Internet access bandwidth by several orders of magnitude. As such, this higher access bandwidth significantly increases the potential for network congestion and bandwidth abuse by heavy users. With this much higher bandwidth available, the usage difference between a heavy user and light user can be quite large, which makes a fixed-price, all-you-can-use pricing plan difficult to sustain; if the service provider charges too much for the service, the light users will be subsidizing the heavy users; if the service provider charges too little, the heavy users will abuse the available network bandwidth, which will be costly for the service provider.

Another technological change is the rapid growth of applications and services that require high bandwidth. Examples include Internet telephony, video-on-demand, and complex multiplayer multimedia games. These types of services increase the duration of time that a user is connected to the network as well as requiring significantly more bandwidth to be supplied by the service provider.

Another technological change is the transition of the Internet from "best effort" to "mission critical". As many businesses are moving to the Internet, they are increasingly relying on this medium for their daily success. This transitions the Internet from a casual, best-effort delivery service into the mainstream of commerce. Business managers will need to have quality of service guarantees from their service provider and will be willing to pay for these higher quality services.

Due to the above driving forces, Internet service providers are moving from current, fixed-rate, all-you-can-use Internet access billing plans to more complex billing plans that charge by metrics, such as volume of data transferred, bandwidth utilized, service used, time-of-day, and subscriber class, which defines a similar group of subscribers by their usage profile, organizational affiliation, or other attributes.

An example of such a rate structure might include a fixed monthly rate portion, a usage allocation to be included as part of the fixed monthly rate (a threshold), plus a variable rate portion for usage beyond the allocation (or threshold). For a given service provider there will be many such rate structures for the many possible combinations of services and subscriber classes.

Network usage analysis systems provide information about how the service provider's services are being used and by whom. This is vital business information that a service provider must have in order to identify fast moving trends, establish competitive prices, and define new services or subscriber classes as needed. Due to the rapid pace that new Internet services are appearing, the service provider must have quick access to this vital information. Known analysis packages feed the network usage data into large databases, and then perform subsequent analysis on the data at a later time. These database systems can get quite large. A service provider with one million subscribers can generate tens of gigabytes of usage data every day. Although the technology for storing vast amounts of data has been steadily improving, Internet traffic is growing at a much faster pace. Storing and managing all of this data is expensive and may eventually become prohibitive. Large and expensive supporting hardware is required (e.g., terabyte disk storage, back-up systems) and expensive relational database management software systems (RDBMS) are required to support very high transaction rates and large data sets. Further, database administrative personnel must be employed to support and maintain these large database management systems.

Once the type of analysis is determined, data mining and analysis software systems are utilized to query and analyze the large amounts of network usage information stored in the databases. The use of data mining and analysis software systems often requires additional business analysis consulting services, additional support hardware, and data mining software licenses. Further, given the amount of data that needs to be processed, the total latency or time aging of the data can be quite long. It may take days to weeks to extract the needed information.

One type of analysis disclosed in U.S. patent application Ser. No.09/548,124, filed Apr. 12, 2000, entitled "Internet Usage Analysis System and Method," utilizes statistical models for analyzing network usage data. Since the raw network usage data is too voluminous to search quickly, statistical models are constructed that are representative of the raw network usage data. These statistical models are stored, and may be subsequently analyzed for solving network usage problems. Network usage data is typically input as a continuous stream of input data at very high data rates.

It is desirable to have the statistical models continuously reflect the most recent events received without having to reconstruct the entire statistical model. For reasons stated above and for other reasons presented in greater detail in the Description of the preferred embodiment section of the present specification, more advanced techniques are required in order to have the statistical models reflect the most recent events received without having to reconstruct the entire statistical model. As such, it is desirable to have a system and method for updating statistical models in real-time.

It is also desirable to have a system and method for updating statistical models in real-time, including updating statistical models over a rolling time interval. Such a system would allow a user to view statistics representative of usage data over a past time period (e.g., 1 hour, 24 hours, 30 days) without being tied to fixed time boundaries. Viewing statistical data representative of usage behavior is particularly valuable when doing business modeling or trying to understand the most recent usage behavior over a desired time period. For example, for a 30 day rolling time interval one always has the past 30 day view to examine. A user does not have to wait until the end of the month to view a 30 day time interval.

SUMMARY OF THE INVENTION

In one embodiment, the present invention provides a system and method for analyzing a stream of data over a rolling time interval. The method includes generating a statistical model from a set of record events. A most recent record event is received. The statistical model is updated using the most recent record event by adding the most recent record event to the statistical model.

Although the term network is specifically used throughout this application, the term network is defined to include the Internet and other network systems, including public and private networks that may or may not use the TCP/IP protocol suite for data transport. Examples include the Internet, Intranets, extranets, telephony networks, and other wire-line and wireless networks. Although the term Internet is specifically used throughout this application, the term Internet is an example of a network.

BRIEF DESCRIPTION OF THE DRAWINGS

FIG. 11 is a diagram illustrating one exemplary embodiment of an aggregation table used in a network usage analysis system and method according to the present invention.

DESCRIPTION OF THE PREFERRED EMBODIMENTS

In the following detailed description of the preferred embodiments, reference is made to the accompanying drawings that form a part hereof and show, by way of illustration, specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
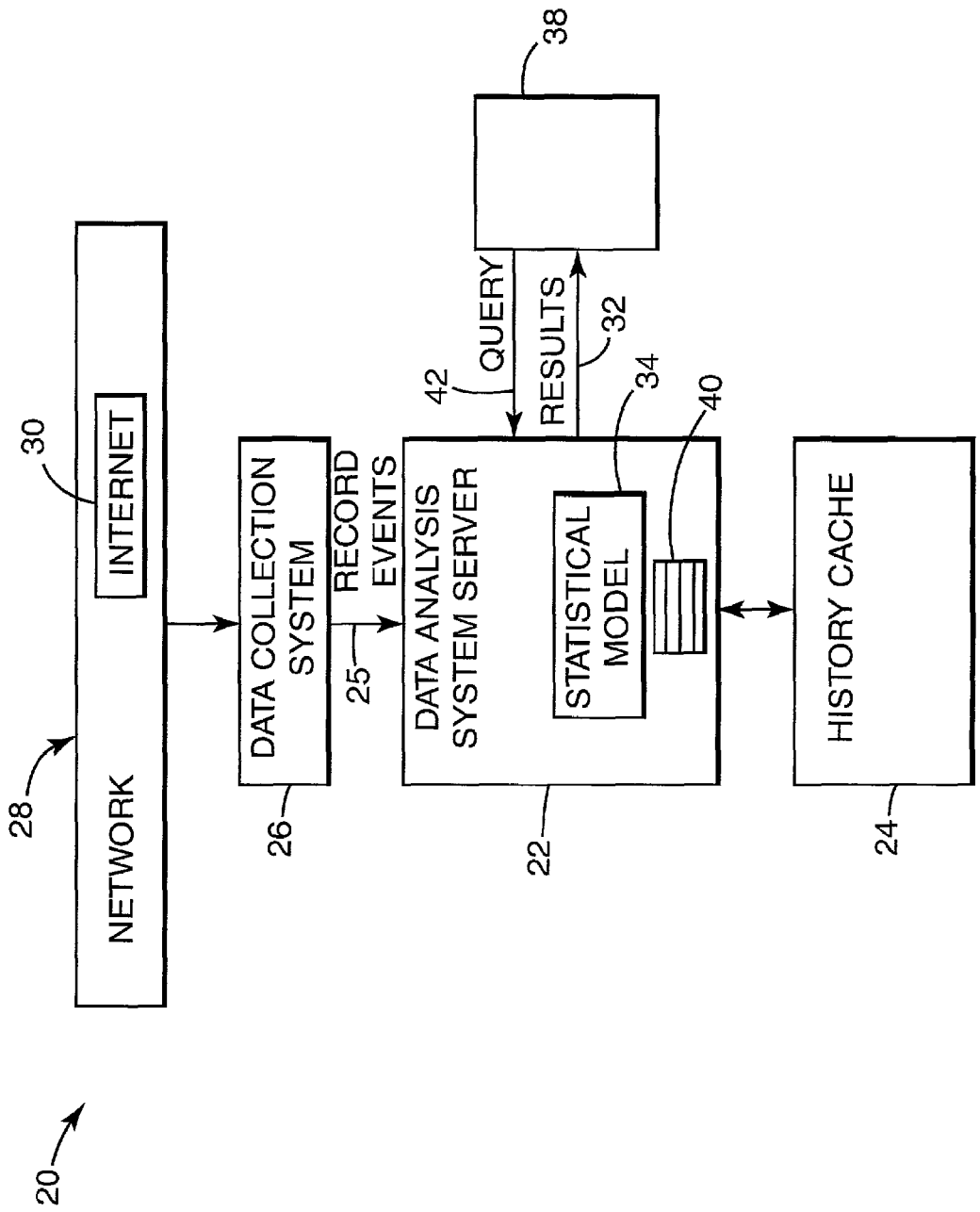
FIG. 1 is a block diagram illustrating one exemplary embodiment of a network usage analysis system and method for updating statistical models and includes an optional rolling time interval according to the present invention.

A network usage analysis system according to the present invention is illustrated generally at 20 in FIG. 1. Network usage analysis system 20 provides a system and method for updating statistical models in real-time, with the optional capability to update statistical models over a rolling time interval. For example, the network usage analysis system 20 allows a system administrator to analyze data over a past time period at any give time. Network usage analysis system 20 includes several main components, each of which is a software program. The main software program components of network usage analysis system 20 run on one or more computer or server systems. In one embodiment, each of the main software program components runs on its own computer system.

In particular, network usage analysis system 20 provides direct statistical representation of usage information that provides compact storage and real time, interactive usage analysis. The network usage analysis system 20 in accordance with the present invention provides for the use and updating of statistical models and the storage of statistical data representative of usage data allowing for real time interactive statistical analysis. The statistical models can themselves be stored, instead of the raw usage data, greatly reducing usage data storage requirements. Since statistical models can be stored and not the usage data itself, with the present invention the storage requirements, within the statistical models do not grow with the volume of usage data the statistical models represent. Instead, the storage requirements for the statistical models are a function of the complexity of the business to be modeled and the granularity of the desired results.

Characteristics of network usage data, such as Internet usage data, when many subscribers are being tracked include the characteristics that the input data events occur virtually as a continuous stream of input data, and at very high data rates. It is desirable that the statistical models used in analyzing the input usage data reflect the most recent events received without having the reconstruct the entire statistical model. As such, the present invention provides for real-time updating of statistical models ranging from simple aggregations to complex statistical models, such as probability distributions, over a rolling time interval. Updating these models in cases where the start of the period is fixed in time is a logical subset of the rolling case.

One suitable network usage analysis system for use with the present invention is disclosed in U.S. patent application Ser. No. 09/548,124, filed Apr. 12, 2000, entitled "Internet Usage Analysis System and Method," having a common assignee and inventor as the present application. U.S. patent application Ser. No. 09/548,124 was previously incorporated herein by reference.

In one exemplary embodiment, network usage analysis system 20 includes a data analysis system server 22 and a history cache 24. Data analysis system server 22 receives usage data or "record events" 25 from data collection system 26. Data collection system 26 receives network usage data from network 28. In one preferred embodiment, network 28 includes the Internet 30.

Commonly, the usage data is a real-time stream of network usage data records or record events. In one embodiment, the usage data is a real-time stream of record events generated from the data collection system 26 positioned on network 28.

Data analysis system server 22 receives the usage data in the form of record events from data collection system 26 via a communication link 25. In one aspect, the usage data collection system 26 is separate from a network usage data mediation system, and in another aspect, the usage data collecting system 26 includes a network usage data mediation system. In another aspect, data collection system 26 is part of the data analysis system server 22. One data collection and mediation system suitable for use with the present invention is commercially available under the trade name INTERNET USAGE MANAGER, from Hewlett-Packard, U.S.A. Other data collection and mediation systems suitable for use with the usage analysis system in accordance with the present invention will become apparent to those skilled in the art after reading the present application.

Data analysis system server 22 uses the usage data to perform predetermined network usage statistical analysis. In particular, a statistical model 34 is defined for solving a network usage related business problem. The usage data analysis system server 22 uses the usage data and the statistical model 34 to generate a statistical result. The data analysis system server 22 operates to store the statistical data in a data storage system. In one aspect, the statistical data is stored in the history cache 24. In one aspect, the data analysis system server 22 is responsive to a user interface 38 for interactive analysis using the statistical model 34. Further, a graphical display of the statistical model 34 can be output to a display system at user interface 38.

In one exemplary embodiment, data analysis system server 22 comprises a computer software program that runs on one or more computers or servers. Statistical model 34 can be stored as statistical data in the form of a table. History cache 24 may be part of a data storage system that may comprise volatile memory (e.g., random access memory (RAM)) and/or non-volatile memory (e.g., a hard disk drive or other persistent storage device). User interface 38 may comprise a keyboard and/or mouse or other interface device with a display system such as a video display device as known in the art.

The network usage analysis system 20 is capable of analyzing a stream of data over a rolling time interval. The statistical model 34 is defined for analyzing the stream of data over the rolling time interval. The rolling time interval is defined to include a plurality of update time intervals. In one exemplary embodiment, record events are received from the stream of data via data collection system 26 for each update time interval. The record event for each update time interval are stored (e.g., temporarily stored) in the history cache 24. A statistical result 32 over the rolling time interval is determined via the data analysis system server 22 using the statistical model 34 and the record events stored in the history cache 24. The statistical result 32 is updated using the statistical model 34 and a most recent record event for a most recent update interval. If the history cache 24 is complete for its designated time interval, updating the statistical result 32 using the statistical model 34 further includes removing a least recent record event associated with a least recent update time interval from the statistical result 32 using the statistical model 34.

In one embodiment, a tracking or accumulation table 40 is utilized to "track" each user ID or customer's usage. Upon receipt of a new record event, only the portion of the accumulation table 40 and statistical model 34 associated with the new record event are updated. As record events are received by the data analysis system server 22 from the data collection system 26, statistical model 34 and accumulation table 40 are continuously updated. Results 32 are only sent to user interface 38 in response to a query 42 of the data analysis system server by a user. The use of accumulation table 40 in connection with statistical model 34 for the present invention is described in detail in this application.

Figure 2:
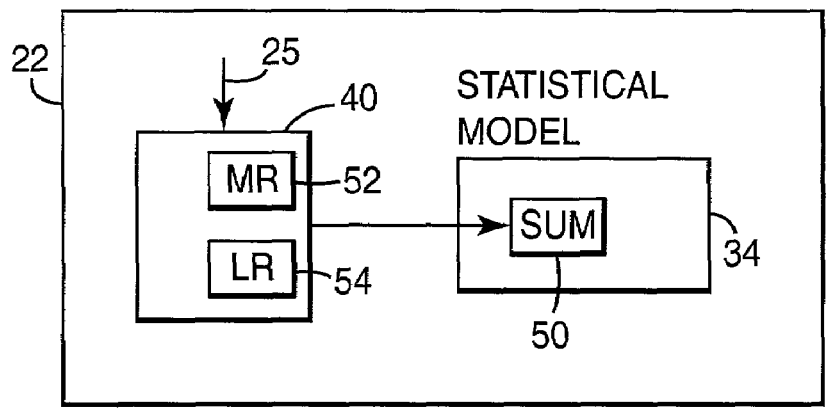
FIG. 2 is a diagram illustrating one exemplary embodiment of a simple statistical model used in a network usage analysis system and method according to the present invention.

FIG. 2 is a diagram illustrating one exemplary embodiment of a statistical model used in a network usage analysis system and method according to the present invention. The statistical model 34 includes maintaining a sum 50 of a desired group of record events received from data collection system 26 over a rolling time period. In one exemplary embodiment, record events 25 are received from data collection 26 and stored in the form of an aggregation table 40. The aggregation table 40 keeps track of a desired group of record events for use by the statistical model 34, including a most recent record event 52 (MR) and a least recent record event 54 (LR). Upon receipt of a most recent record event 52, the most recent record event 52 and least recent record event 54 are received by the statistical model 34 for updating of sum 50. As such, the entire aggregation table 40 is not rescanned for updating sum 50. Only the most recent record event 52 and the least recent record event 54 for a desired time interval are required for updating of the statistical model sum 50.

Figure 3:
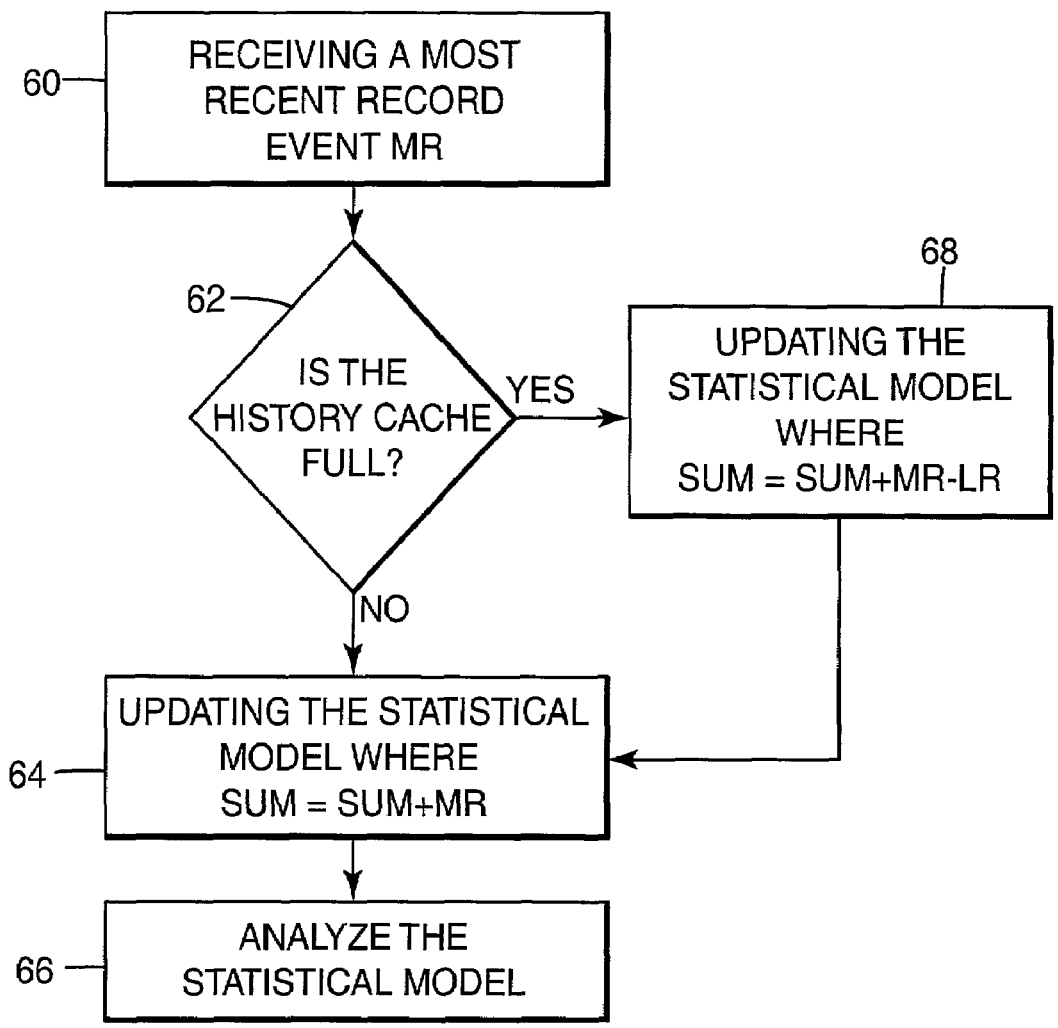
FIG. 3 is a flow diagram illustrating one exemplary embodiment of a method for updating statistical models over a rolling time interval in a network usage analysis system according to the present invention.

FIG. 3 is a flow diagram illustrating one exemplary embodiment of a method of updating a statistical model using a network usage analysis system according to the present invention. At 60, a most recent record event 52 is received. At 62, a determination is made as to whether the history cache is complete. At 64, if the history cache is not complete, the statistical model sum 50 is updated, where the sum equals the sum plus the most recent record event 52 (SUM=SUM+MR). At 66, the updated statistical model is available to be analyzed.

If the history cache is complete, at 68, the statistical model is updated where the updated sum 50 equals the original sum 50 plus the most recent record event 52 minus the least recent record event 54 (SUM=SUM+MR−LR). At 66, again the updated statistical model is available to be analyzed.

FIGS. 4-8 illustrate one exemplary embodiment of analyzing a group of record events using the network usage analysis system according to the present invention, including updating a more complex statistical model in real-time without having to reconstruct the entire model.

Figure 4:
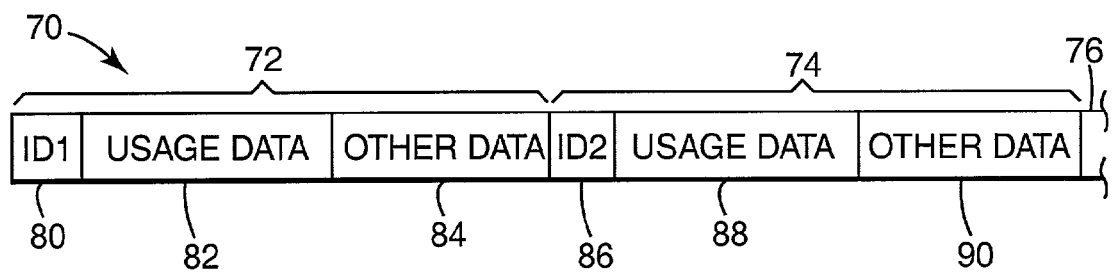
FIG. 4 is a diagram illustrating one exemplary embodiment of a record event set.

FIG. 4 is a diagram illustrating one exemplary embodiment of a record event set 70 which might be received from the data collection system 26. Record event set 70 includes one or more record events, indicated as record event 72, record event 74, and record event 76. Each record event typically includes one or more data attributes or fields, 82, 84, 88 and 90, and an event identifier, 80 and 86, associated with each record event. As shown, first subscriber or customer identifier 80 (ID1) is associated with usage data record 82 and other data record type 84. The second subscriber or usage data identifier 86 (ID2) is associated with usage data record 88 and other data record type 90.

Figure 5:
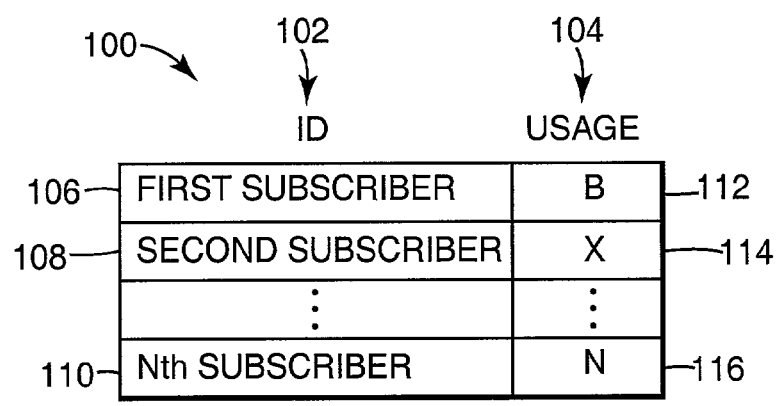
FIG. 5 is a diagram illustrating one exemplary embodiment of an aggregation table used in a network usage analysis system and method according to the present invention.

FIG. 5 is a diagram illustrating one exemplary embodiment of an aggregation table used in a network usage analysis system and method according to the present invention. The aggregation table 100 is generated by data analysis system server 22 upon receipt of record events from the data collection system 26. In one exemplary embodiment illustrated, aggregation table 100 includes a first identification column 102 (ID) and a second usage column 104. Identification column 102 includes an identifier associated with the logged record event, such as first subscriber 106 (e.g., ID1), second subscriber 108 (e.g., ID2), through nth subscriber 110, indicated. Usage column 104 contains the usage sum (e.g., bytes or megabytes) associated with each identifier, indicated as usage sum 112(B) usage sum 114(X) and usage sum 116(N).

Figure 6:
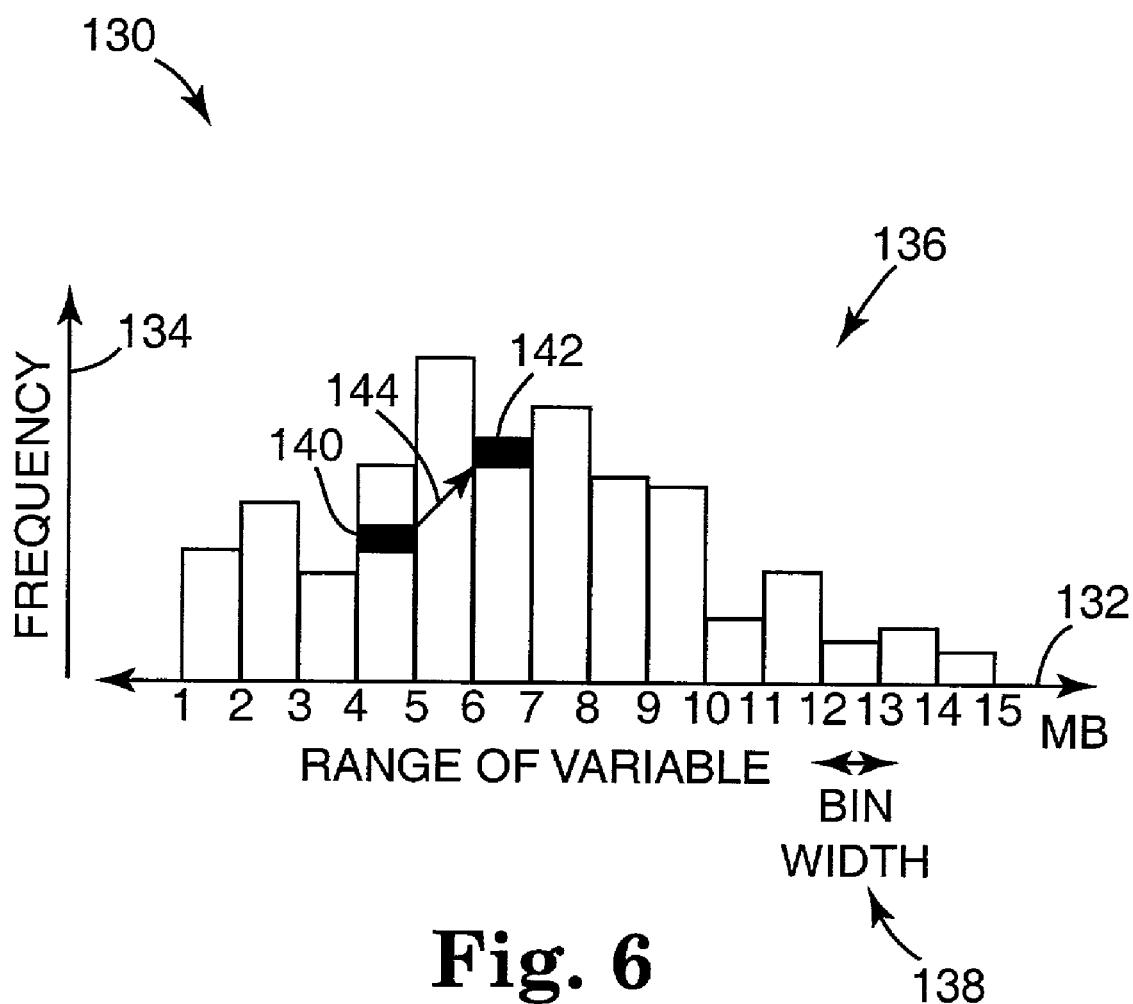
FIG. 6 is a diagram illustrating one exemplary embodiment of updating a histogram statistical model used in a network usage analysis system and method according to the present invention.

FIG. 6 is a diagram illustrating one exemplary embodiment of a statistical model for use with the network usage analysis system according to the present invention. In the exemplary embodiment illustrated, the statistical model is a histogram. The histogram statistical model 130 is populated at the same time that the aggregation table 100 previously described herein is built. The histogram statistical model 130 includes an x-axis 132 illustrating the expected range of variable (e.g., total usage in megabytes) and a y-axis 154 that is the frequency or number of hits that correspond to the number of customers or subscribers with total usage within each bin range. As the record events for each user or identifier are collected and analyzed, and tracked in aggregation table 120, corresponding statistical data is stored in the form of a number of "groups" or "bins," indicated at 136. The information stored in the statistical model 130 is no longer is associated with any particular user identifier. In the exemplary embodiment shown, each bin has the same width, indicated at 138. The frequency or number of customers or subscribers associated with the variable range 132 for each bin 136 is tabulated. The resulting histogram, (which may be stored in the form of a table in memory) is used for subsequent network analysis, such as the computation of a probability density corresponding to the histogram 130.

In the present invention, it is desirable to update the histogram statistical model 130. In one exemplary embodiment, the usage sum 112(B) attributable to first subscriber 106 is first indicated at 140 as one of the many already recorded events in the bin with a defined range of 4-5. Upon receiving an updated group of record events, an update record event is received for the first subscriber 106 having an update usage value A. The currently stored usage value B is found in the aggregation table for the first subscriber 106. The usage value B is subtracted from the statistical model, indicated at 140, by decrementing the total of events recorded in the bin by one. The update usage value A and the usage value B are summed to create a new usage value C. The new usage value C is inserted into the statistical model, indicated at 142 by arrow 144 by incrementing the total of recorded events stored in that bin by one. The aggregation table 100 is updated to usage value C for first subscriber 106. As such, the entire statistical model need not be regenerated, only the portion of the statistical model which is affected by the most recent record event.

Figure 7:
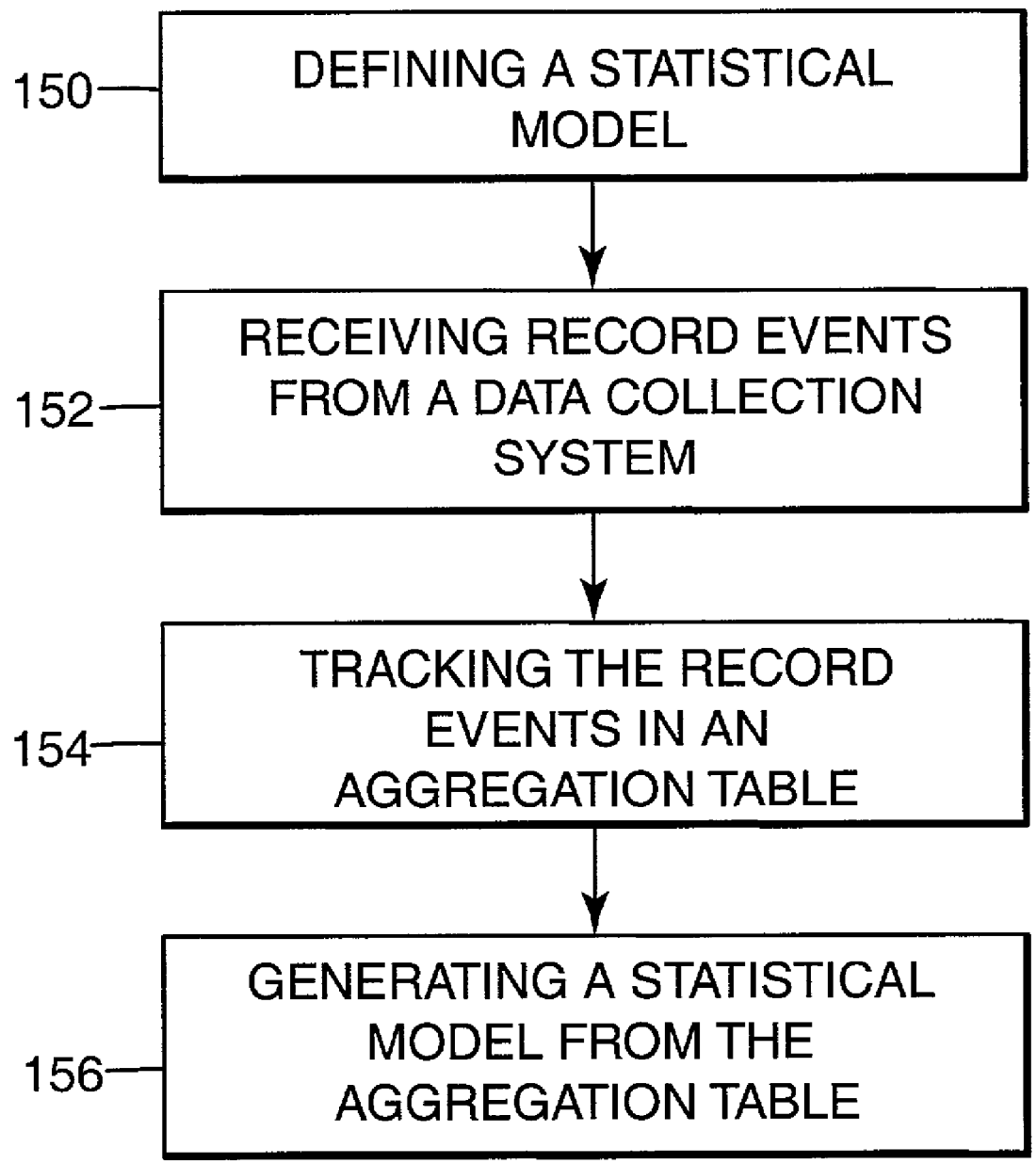
FIG. 7 is a flow diagram illustrating one exemplary embodiment of a method for analyzing a stream of data using the network usage analysis system and method according to the present invention.
Figure 8:
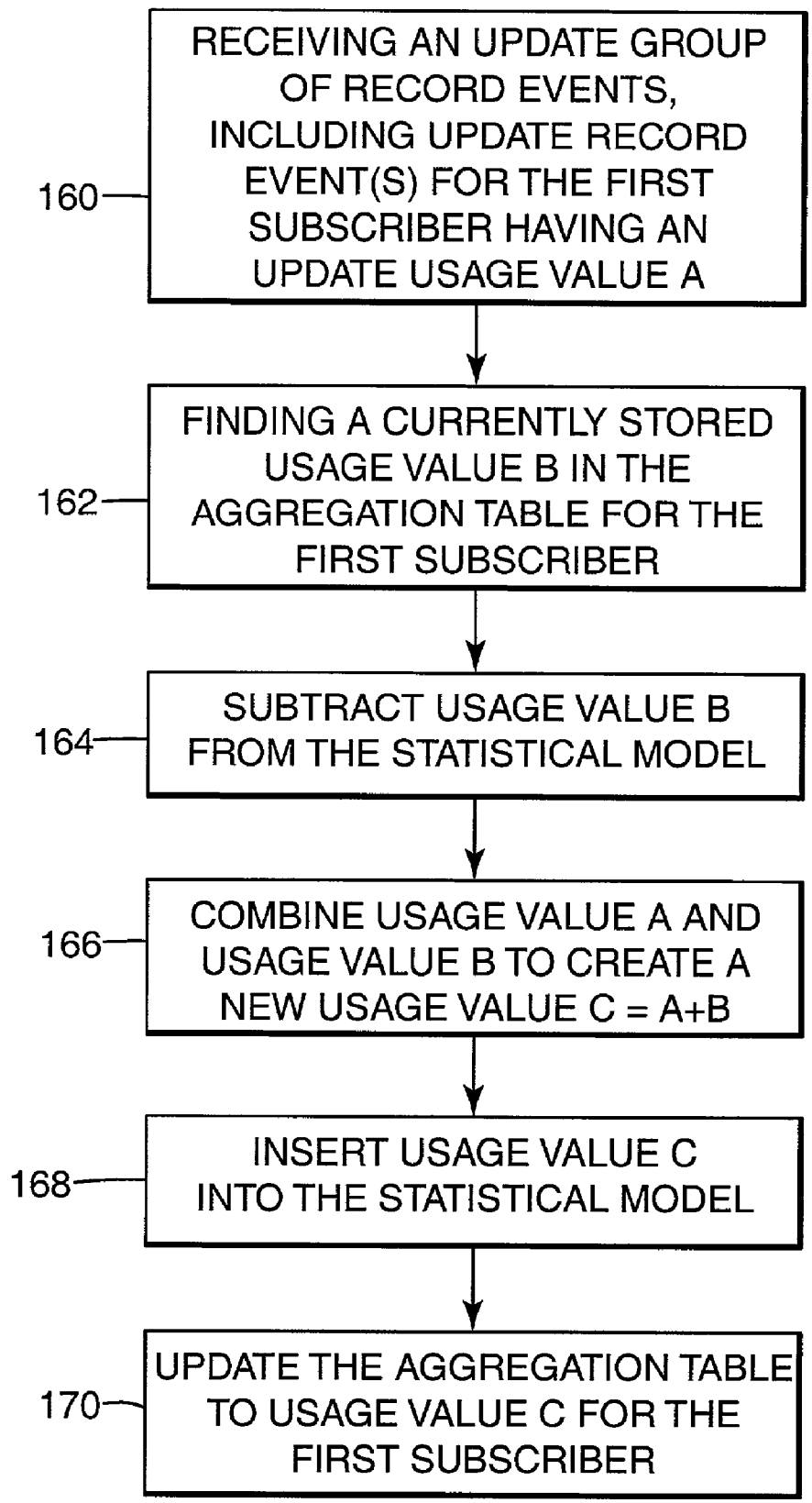
FIG. 8 is a flow diagram illustrating another exemplary embodiment of a method for analyzing a stream of data using a network usage analysis system and method according to the present invention.

FIGS. 7 and 8 illustrate one exemplary embodiment of a method of updating complex statistical models using the network usage analysis system according to the present invention illustrated in the example of FIGS. 4-6. At 150, a statistical model is defined. At 152, record events are received from a data collection system. At 154, the record events are tracked. In one preferred embodiment, the record events are tracked in an aggregation table such as aggregation table 100. At 156, a statistical model such as 130 is generated from the aggregation table 100. In FIG. 8, at 160 an update group of record events are received, including update record events for the first subscriber 106 having an update usage value A. At 162, a currently stored usage value B is found in the aggregation table 100 for the first subscriber 106. At 164, the usage value B is subtracted from the statistical model 130, represented by segment 140. At 166, usage value A and usage value B are combined to create a new usage value sum C=A+B. At 168, the new usage value C is inserted into the statistical model 130, represented by arrow 144 and segment 142. At 170, the aggregation table 100 is updated to usage value C for the first subscriber 106.

The network usage analysis system according to the present invention is capable of updating simple to complex statistical models over a rolling time interval. FIGS. 9 through 12 illustrate exemplary embodiments of analyzing a stream of data over a rolling time interval using the network usage analysis system according to the present invention including updating statistical models in real-time without having to reconstruct the entire model.

Figure 9:
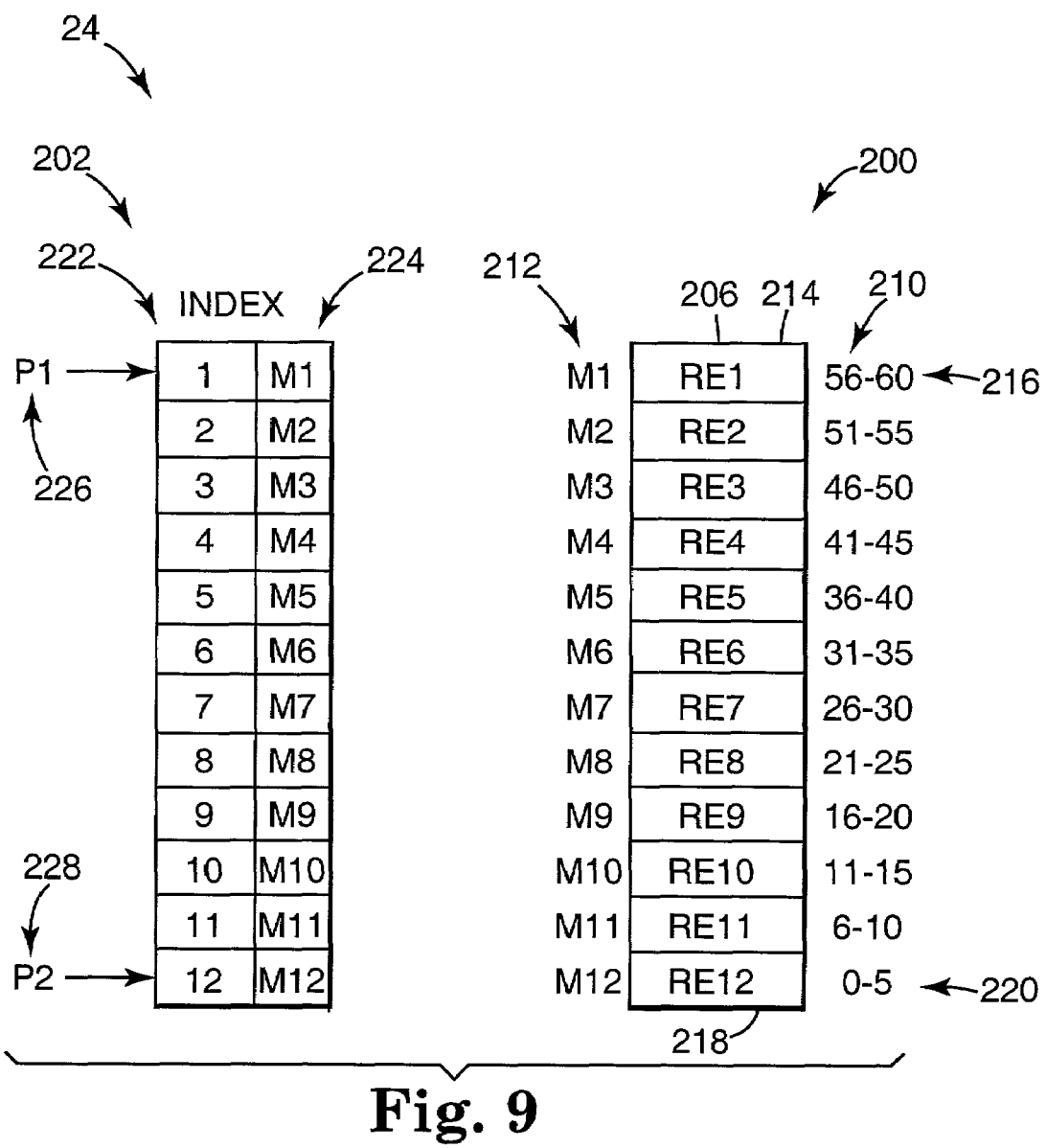
FIG. 9 is a diagram illustrating one exemplary embodiment of a history cache that assists in updating statistical models representative of data over a rolling time interval and used in a network usage analysis system and method according to the present invention.

FIG. 9 is a diagram illustrating one exemplary embodiment of a history cache used in a network usage analysis system and method according to the present invention that enables the time interval over which the statistical data is collected to be a rolling time interval. History cache 24 is used for organizing and storing statistical data over a rolling time interval, i.e., moving forward in time. History cache 24 includes memory array 200 and array index 202. Memory array 200 includes an array of memory segments 206 for storing record events received corresponding to each update time interval. In one exemplary embodiment shown, the rolling time interval is defined as one hour, wherein each update time interval is defined to be 5 minutes. As such, memory array 200 is divided into 12 memory array segments 206 (60 minutes divided by 5 minutes), wherein each memory array segment is associated with a corresponding 5 minute update time interval 210. Memory address 212 illustrates the beginning memory address for each memory array segment 206.

Record events or record event sets are received and stored in the memory segment corresponding to each update interval. Update time intervals 210 illustrate the time or "age" of the update time interval within the rolling time interval. For example, in the one hour rolling time interval illustrated record event RE1 is stored in the memory segment beginning at address Ml, indicated at 214, for the least recent time interval 56 to 60 minutes, indicated at 216. Record event RE12 is the most recent record event 218 received corresponding to the most recent time interval 0 to 5 minutes, indicated at 220. Correspondingly, record event RE2 is located at address M2, record event RE3 is located at address M3, record event RE4 is located at address M4, record event RE5 is located at address M5, record event RE6 is located at address M6, record event RE7 is located at address M7, record event RE8 is located at address M8, record event RE9 is located at address M9, record event RE10 is located at address M10, record event RE11 is located at address M11, and record RE12 is located at address M12.

Array index 202 provides a mapping index to the memory locations which store the record events for each update time interval. Array index 202 includes a contiguous array of index segments, indicated as index segments 1, 2, 3, 4, 5, 6, 7, 8, 9, 10, 11 and 12 with a pointer 224 to the corresponding memory array segment 206, indicated at Ml, M2, M3, M4, M5, M6, M7, M8, M9, M10, M11, M12. First pointer 226 and second pointer 228 are used for tracking desired memory locations within the rolling time interval. First pointer 226 (P1) provides a pointer to the memory location of the least recent record event 214, and a second pointer 228 provides a pointer to the location of the most recent record event 228. As the location of the least recent record event and the most recent record event changes with the rolling time interval, the pointers are changed (e.g., incremented) accordingly.

In operation, memory array 200 is allocated in history cache 24, and corresponding array index 202 is defined. As record events are received, the record events are stored in the memory array segment 206 associated with the corresponding update time interval 210. The entire memory array 200 within history cache 24 is completed in this manner. A statistical model 34 is constructed over the rolling time interval each record event as it arrives and stored in the history cache 24 using the least most recent record event 54. The statistical model 34 is updated using the statistical model and a most recent record event 216 for a most recent update time interval 220.

Figure 10:
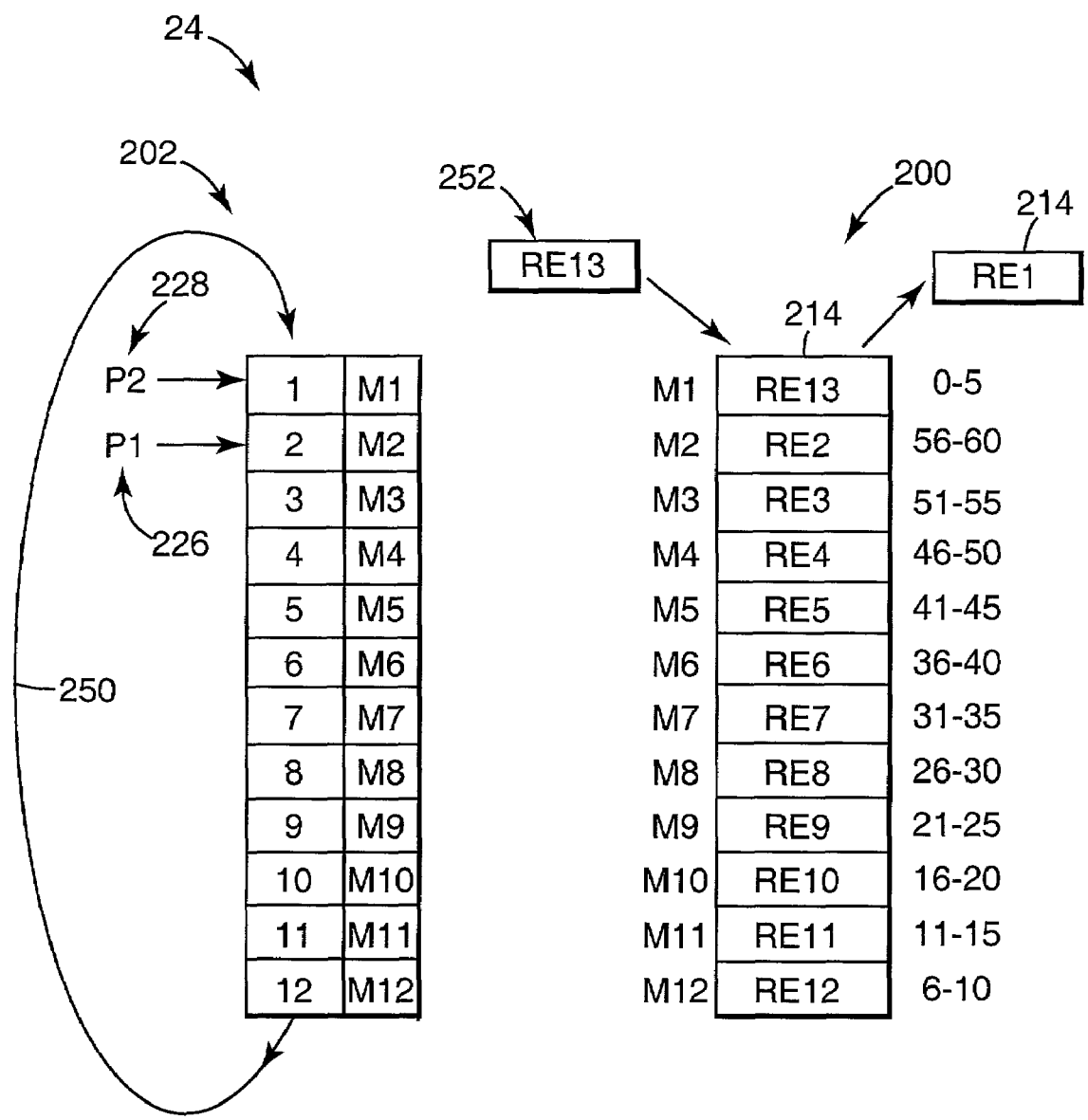
FIG. 10 is a diagram illustrating another exemplary embodiment of a history cache that assists in updating statistical models representative of data over a rolling time interval and used in a network usage analysis system and method according to the present invention.

FIG. 10 is a block diagram illustrating another exemplary embodiment of the history cache shown in FIG. 9. The history cache 24 is complete and a record event is received for a most recent update time interval. In this exemplary embodiment, the memory array is operated as a circular buffer, indicated at 250. The memory storage locations for the least recent record event and the most recent record event are tracked using array index 202. In operation, upon receipt of a most recent record event 252, it is first determined whether the history cache 24 is complete (i.e., full). If the history cache 24 is complete, the least recent record event 214 (RE1) is replaced in memory by the most recent record event 252 (RE13). First pointer 226 (P1) is moved (e.g., incremented) to the next consecutive index segment, such that it again points to the memory segment containing the least recent record event for the least recent update time interval, memory segment M2. Second pointer 228 (P2) is moved (e.g., incremented) to the next consecutive index segment such that it points to the memory location storing the most recent record event (RE13) for the most recent update time interval. In one statistical model example, for a single user or record identifier, a statistical sum of the record events stored in data storage system is kept, by adding the most recent record event and storing them in history cache 24 until the history cache 24 is complete. Upon receipt of a most recent record event, instead of rescanning the whole history cache 24 to determine a new sum of record events, the sum is updated by merely subtracting the value of the least recent record event removed from the history cache and adding the value of the most recent record event added to the history cache.

FIG. 11 is a diagram illustrating one exemplary embodiment of an aggregation table used as a statistical model in a network usage analysis system and method according to the present invention. Aggregation table 260 can be similar to the aggregation table 100 previously described herein. Aggregation table 260 includes identifier column 262 and usage column 264. In particular, aggregation table 260 is used to track the usage sum over the rolling time interval for multiple users. As such, row 266 tracks the sum for Joe, row 268 tracks the sum for Susan, row 270 tracks the sum for Sam, row 272 tracks the sum for Mary, row 274 tracks the sum for Frank, row 276 tracks the sum for Alice, row 278 tracks the sum for Tom, and subsequent rows, indicated by 280, 282, track the sums for subsequent users. Over the rolling time interval, upon receipt of a most recent record event and removal of a least recent record event, only the sums are changed or updated for the corresponding users affected by the removal of the least recent record event and addition of the most recent record event (See previous FIGS. 2 and 3). In the exemplary embodiment shown, the removal of the least recent record event 214 and addition of the most recent record event 252 to history cache 24 only affects the sum for user ID Mary in row 272. As such, only the sum in row 272 is updated, indicated at 284.

Figure 12:
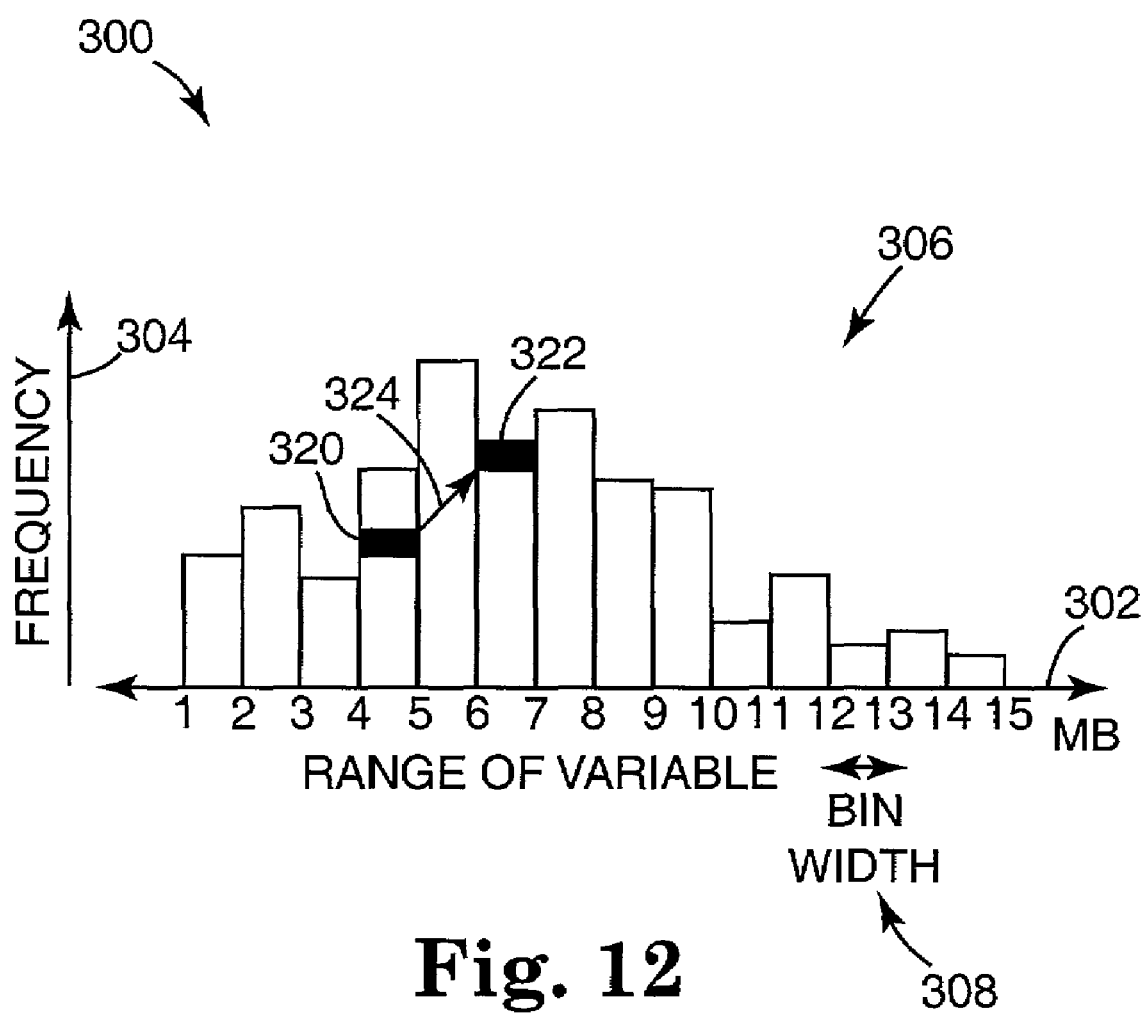
FIG. 12 is a diagram illustrating one exemplary embodiment of updating a histogram statistical model used in a network usage analysis system and method according to the present invention.

FIG. 12 is a diagram illustrating one exemplary embodiment of a histogram statistical model for use with the network usage analysis system according to the present invention. The histogram statistical model 300 is generated using the aggregation table 260 previously described herein. Histogram statistical model 300 includes a x-axis 302 illustrating a range of variable (e.g., total usage in megabytes) and a y-axis 304, which is the frequency or number of hits which correspond to the number of customers or subscribers within each variable range. As the record events for each user or identifier is collected and analyzed, corresponding statistical data is stored in the form of a number of "groups" or "bins", indicated at 306. In the exemplary embodiment shown, each bin has the same width, indicated at 308. The frequency or number of customers or subscribers associated with the variable range 302 for each bin 306 is tabulated. The resulting histogram (which may be stored in the form of a distribution table in memory) is used for subsequent network usage analysis, such as the computation of a probability density corresponding to the histogram 300.

In the present invention, it is desirable to update the histogram statistical model 300 over the rolling time interval. As such, the usage sum attributable to Mary (row 272) is first indicated at 320 in the bin 4-5. Upon updating of the aggregation table, and row 272 containing Mary, at the same time first segment 320 is removed from bin 4-5, and the segment representing the updated sum is inserted in bin 6-7, indicated at 322 via arrow 324. As such, the entire statistical model need not be regenerated, only the portion of the statistical model which is affected by the most recent record event associated with the most recent update time interval is changed or updated.

Figure 13:
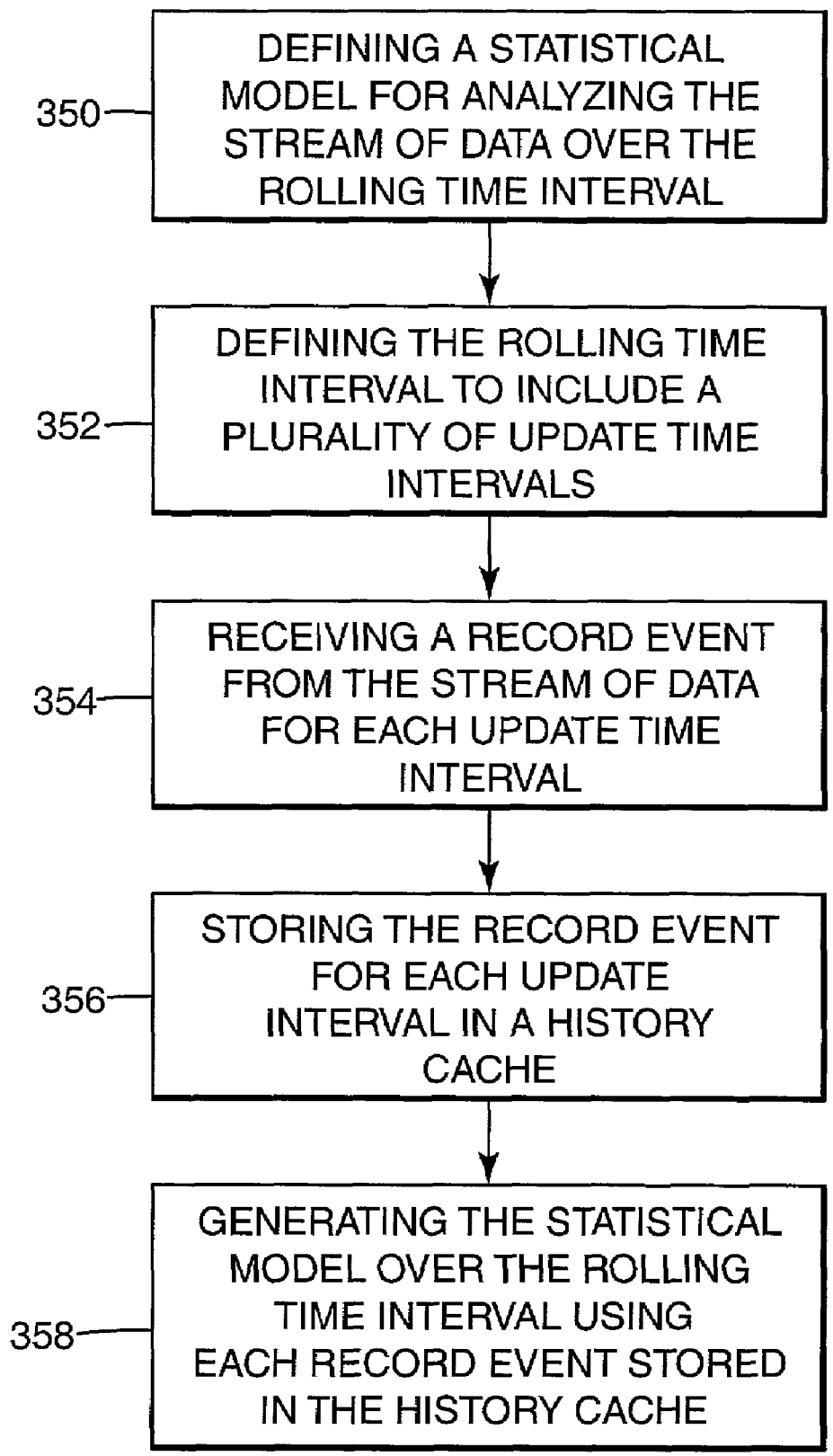
FIG. 13 is a flow diagram illustrating one exemplary embodiment of a method for analyzing a stream of data over a rolling time interval using the network usage analysis system and method according to the present invention.

FIG. 13 is a flow diagram illustrating one exemplary embodiment of a method for analyzing a stream of data over a rolling time interval according to the present invention. At 350, a statistical model is defined for analyzing the stream of data over the rolling time interval. In one aspect, the statistical model is a simple aggregation of record events received from the stream of data over the rolling time interval. In other aspects, the statistical model may include more complex statistical models, such as histograms, probability distributions, correlation matrices etc., over a rolling time interval.

At 352, the rolling time interval is defined to include a plurality of update time intervals. In one example, the rolling time interval is defined as 60 minutes. In one aspect, the rolling time interval is defined to include 12 update time intervals, wherein each update time interval is 5 minutes. A record event or record event set is received from the stream of data for each update time interval, indicated at 354. The record event for each update time interval is stored, indicated at 356. In one aspect, the record event includes a identifier associated with the record event data. The record event for each update interval is stored in a history cache. In one aspect the history cache include an array of memory segments for storing the record event for each update interval, wherein the number of memory segments is equal to the number of update intervals in the rolling time interval. An array index may also be provided for indexing and providing pointers to the memory locations for each memory segment.

At 358, a statistical result is determined over the rolling time interval using the statistical model and each record event stored in the history cache. In one embodiment, the statistical model is a summation or aggregation of record events for each user identifier over the rolling time interval. As such, each record event received is stored in a memory segment in the history cache, and the value of each record event for a user identifier is added to a sum maintained for that user identifier.

Figure 14:
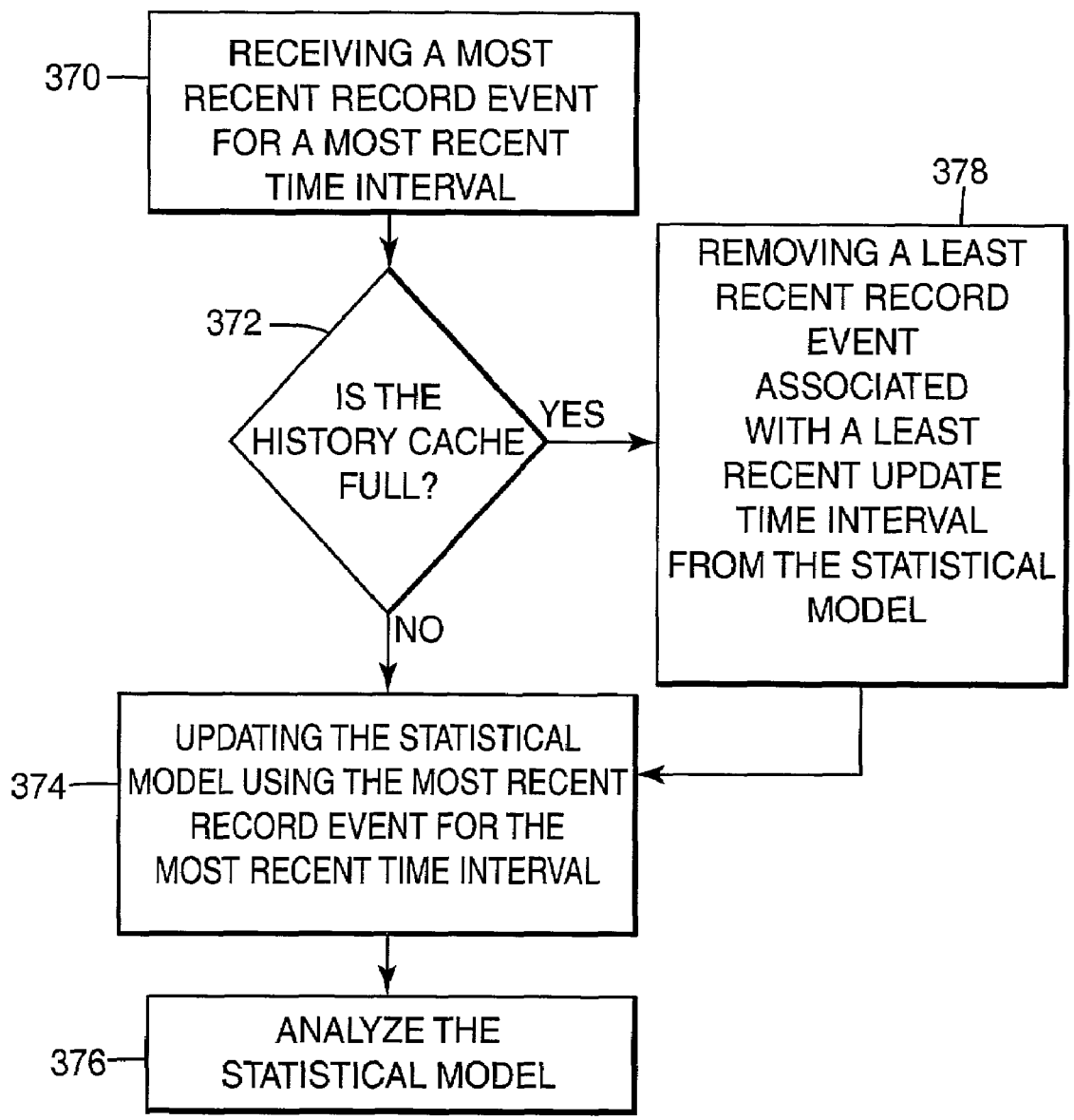
FIG. 14 is a flow diagram illustrating another exemplary embodiment of a method for analyzing a stream of data over a rolling time interval using a network usage analysis system and method according to the present invention.

FIG. 14 is a flow diagram further illustrating a method of analyzing a stream of data over a rolling time interval according to the present invention. At 370, a most recent record event is received for a most recent time interval. At 372, it is determined whether the history cache is complete (i.e., full). If the history cache is not complete, the statistical model is updated using the most recent record event for the most recent time interval, indicated at 374. If the history cache is complete, a least recent record event associated with a least recent update time interval is removed from the statistical model, indicated at 378. Then the statistical model is updated using the most recent record event for the most recent time interval. In one embodiment, the least recent record event associated with a least recent update time interval is removed from storage and the memory array, and replaced by the most recent record event for the most recent time interval. In one aspect, wherein the statistical model is a summation of record events for each user identifier, the least recent record event associated with the least recent update time interval is subtracted from the summation and the most recent record event for the most recent time interval is added to the summation. At 376, the statistical results may now be analyzed.

Figure 15:
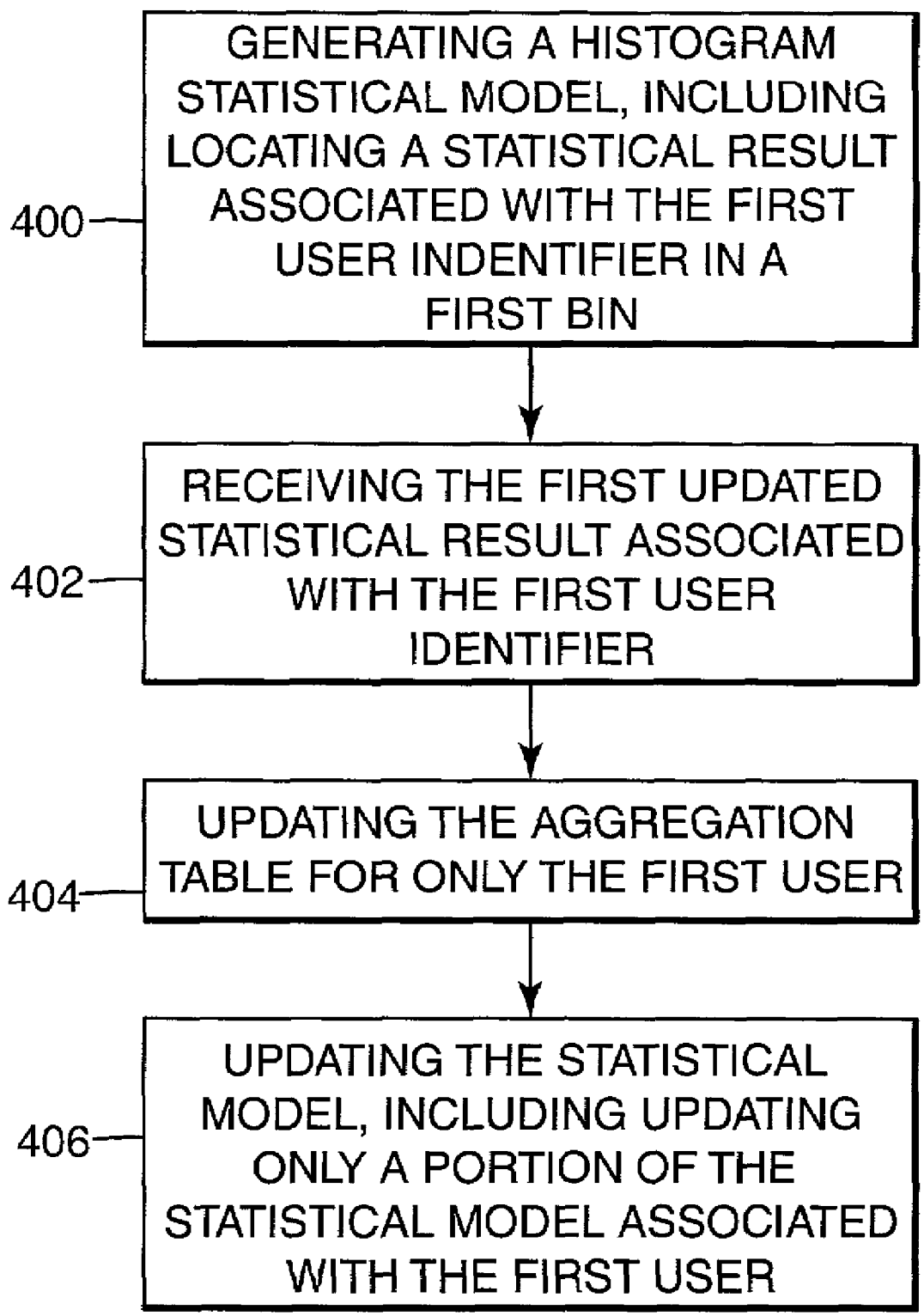
FIG. 15 is a flow diagram illustrating another exemplary embodiment of a method for analyzing a stream of data using a network usage analysis system and method according to the present invention.

FIG. 15 is a flow diagram illustrating another exemplary embodiment of generating and updating a statistical model according to the present invention. At 400, a histogram statistical model is generated, including locating a statistical result associated with the first user identifier in a first bin. At 402, the first updated statistical result associated with the first user identifier is received. At 404, the aggregation table is updated only for the first user. At 406, the statistical model is updated, including updating only a portion of the statistical model associated with the first user.

The value of a rolling time interval is that the end user of this system can view the past one hour (e.g., or past twenty-four hours, or past thirty days) without being tied to fixed points in time such as the hour boundaries dictated by a wall clock or calendar (e.g., midnight, end of a week, or end-of-the-month or months). If the rolling time interval is defined as a thirty day rolling time interval with five minute update time intervals, then the statistics of users or subscribers can be viewed as follows: if the time is 3:32 p.m. on the tenth of the month, one can view the past thirty days with a data currency of within two minutes. The statistical model will represent data recorded from 3:30 p.m. thirty days ago until 3:30 p.m. today (two minutes ago). This view is particularly valuable when doing modeling or trying to understand a most recent subscriber behavior, as one always has a thirty-day view to examine. A user doesn't have to wait until the end of the month.

Alternatively, the present invention is not tied to use with a rolling time interval period. At the end of a "statistical aggregation period" (e.g., one hour, one day, thirty days, etc) the model is archived. The statistical model is cleared and data is collected for the next period.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electromechanical, electrical, statistical and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method for analyzing a stream of network usage data comprising:
   generating a statistical model from a set of usage data record events from the stream of network usage data;
   receiving a most recent record event;
   updating the statistical model using the most recent record event by adding the most recent record event to the statistical model, wherein an identifier is associated with each record event, including updating only a portion of the statistical model associated with the identifier;
   storing the set of record events in a history cache, and wherein if the history cache is full, updating the statistical model includes removing a least recent record event from the statistical model; and
   defining the statistical model to include an aggregation of each record event set stored in the history cache;
   wherein generating a statistical model from the set of record events includes generating an aggregation table for tracking an aggregation of record events associated with an identifier; and
   wherein the most recent record event is associated with an identifier; and wherein updating the statistical model includes updating only the aggregation of record events in the tracking table for that identifier.

2. The method of claim 1, comprising generating a complex statistical model representative of the network data from the aggregation table.

3. The method of claim 1, comprising generating a histogram statistical model representative of the network data from the aggregation table.

4. The method of claim 1, further comprising generating a complex statistical model from the aggregation table.

5. The method of claim 4, further wherein updating the statistical model includes updating only a portion of the complex statistical model associated with an identifier.

6. The method of claim 1, further comprising generating a histogram statistical model from the aggregation table.

7. The method of claim 6, wherein if the history cache is full, updating the statistical model further includes removing a least recent record event set associated with a least recent update time interval from the statistical model.

8. The method of claim 6, further comprising defining the statistical model to include an aggregation of each record event set stored in the history cache.

9. The method of claim 6, further comprising storing each record event in a memory segment in the history cache.

10. The method of claim 9, further comprising defining an index array including a set of contiguous index segments, wherein each index segment including a pointer to the memory segment storing in the history cache storing the next consecutive record event.

11. The method of claim 10, further defining a first pointer to the index segment associated with the memory segment storing the least recent record event.

12. The method of claim 11, wherein upon receiving a most recent record event the method further comprising replacing the least recent record event stored in the history cache with the most recent record event.

13. The method of claim 12, further comprising moving the first pointer to the next contiguous index segment.

14. The method of claim 11, further defining a second pointer to the index segment associated with the memory segment storing the most recent record event.

15. The method of claim 1, wherein upon receiving a most recent record event the method further comprising replacing the least recent record event stored in the history cache with the most recent record event.

16. A method for analyzing a stream of network usage data over a rolling time interval comprising:
   defining a statistical model for analyzing the stream of network usage data over the rolling time interval;
   defining the rolling time interval to include a plurality of update time intervals;
   receiving a record event set from the stream of data for each update time interval, each record event set including one or more record events, wherein each record event is associated with a user identifier;
   storing the record event set for each update interval in a history cache;
   generating the statistical model over the rolling time interval using each record event stored in the history cache;
   updating only a portion of the statistical model associated with the most recent record event for a most recent update time interval;
   defining the statistical model to include an aggregation table having an aggregation table entry for tracking an aggregation of each record event set stored in the history cache for each user identifier; and
   generating a histogram from the aggregation table;
   wherein the step of updating the statistical model includes the step of updating only the aggregation table entry associated with the most recent record event; and
   wherein updating the statistical result includes updating only the portion of the histogram associated with the aggregation table entry associated with the most recent record event.

17. The method of claim 16, wherein if the history cache is full, updating the statistical model further includes removing a least recent record event set associated with a least recent update time interval from the statistical model.

18. A network usage analysis system for analyzing a stream of network usage data comprising:
   a data analysis system server which generates a statistical model from a set of usage data record events, and upon receiving a most recent record event, the data analysis system server updates the statistical model using the most recent record event by adding the most recent record event to the statistical model, wherein customer usage is associated with each record event, including updating only a portion of the statistical model associated with the customer usage;
   defining a history cache, wherein the data analysis system server stores the set of record events in the history cache, and wherein if the history cache is full, updating the statistical model includes removing a least recent record event from the statistical model; and
   defines the statistical model to include an aggregation of each record event set stored in the history cache;
   wherein an identifier is associated with each record event, and wherein generating a statistical model from the set of record events includes the data analysis system server generating an aggregation table for tracking an aggregation of record events associated with an identifier; and
   wherein the most recent record event is associated with an identifier; and wherein the data analysis system server updating the statistical model includes updating only the aggregation of record events in the tracking table for that identifier.

19. The system of claim 18, wherein the data analysis system server generates a complex statistical model representative of the network data from the aggregation table.

20. The system of claim 18, further wherein the data analysis system server generates a complex statistical model from the aggregation table.

21. A method for analyzing a stream of network usage data comprising:
   generating a statistical model from a set of network usage record events;
   receiving a most recent record event; and updating the statistical model using the most recent record event by adding the most recent record event to the statistical model further comprising the steps of:
      storing the set of record events in a history cache;
      wherein if the history cache is full, updating the statistical model includes removing a least recent record event from the statistical model, further comprising:
      defining the statistical model to include an aggregation of each record event set stored in the history cache, wherein an identifier is associated with each record event, and wherein generating a statistical model from the set of record events includes generating an aggregation table for tracking an aggregation of record events associated with an identifier, wherein the most recent record event is associated with an identifier; and
      wherein updating the statistical model includes updating only the aggregation of record events in the tracking table for that identifier, further comprising generating a histogram statistical model from the aggregation table, wherein the history cache is an array of memory segments, wherein the number of memory segments is equal to the number of update time intervals in the rolling time interval, and storing each record event in a memory segment in the history cache, and defining an index array associated with the statistical model including a set of contiguous index segments, wherein each index segment includes a pointer to the memory segment in the history cache storing the next consecutive record event, further defining a first pointer to the index segment associated with the memory segment storing the least recent record event, wherein upon receiving a most recent record event the method replacing the least recent record event stored in the history cache with the most recent record event, and further moving the first pointer to the next contiguous index segment.

22. The method of claim 21, wherein the histogram statistical model includes a first statistical model including a histogram having a first axis illustrating total usage defined by a number of bins, each bin having a usage variable range, and a second axis defined by a frequency corresponding to a number of users having a total usage within the usage variable range of each bin.

* * * * *